UNITED STATES PATENT OFFICE.

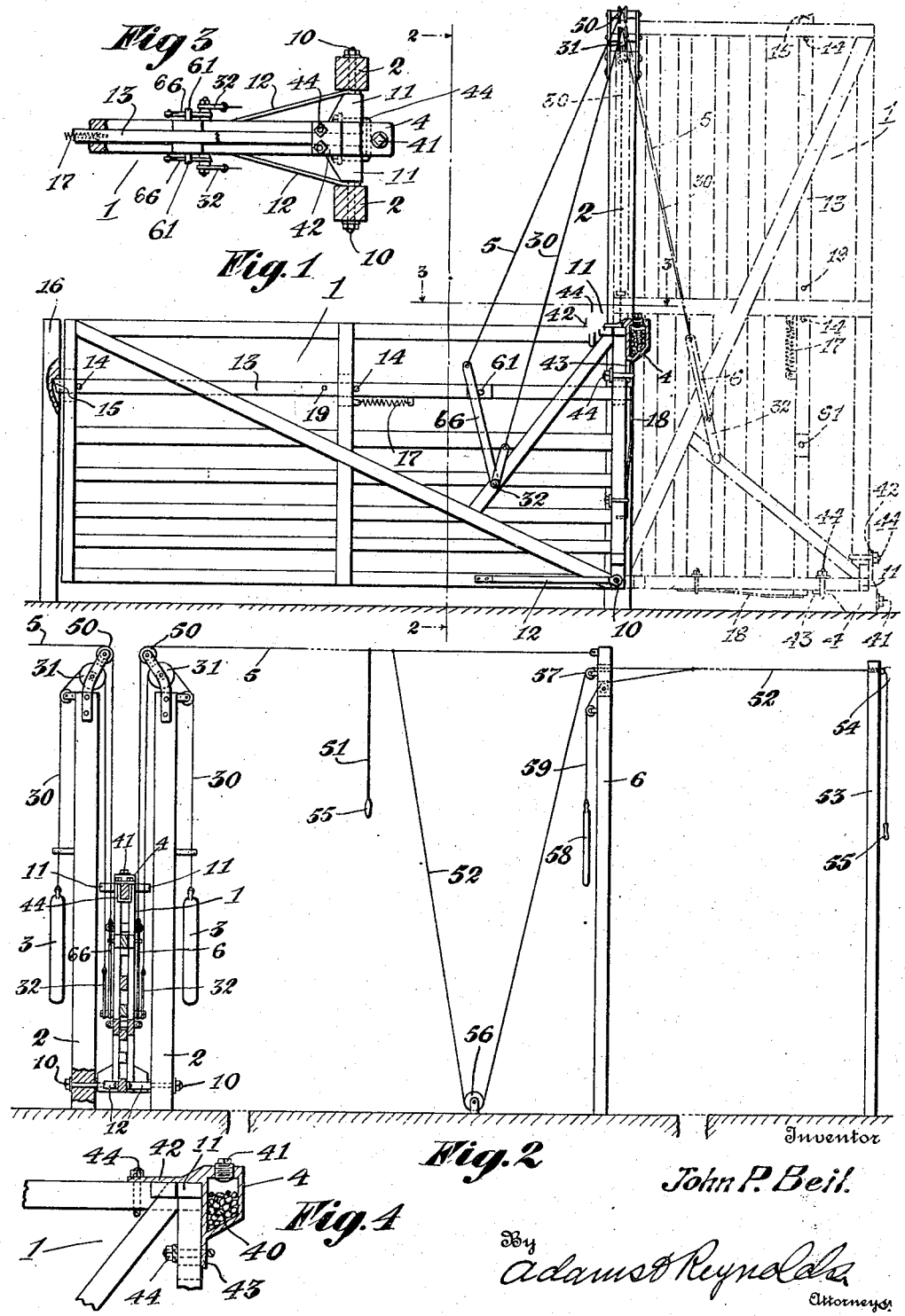

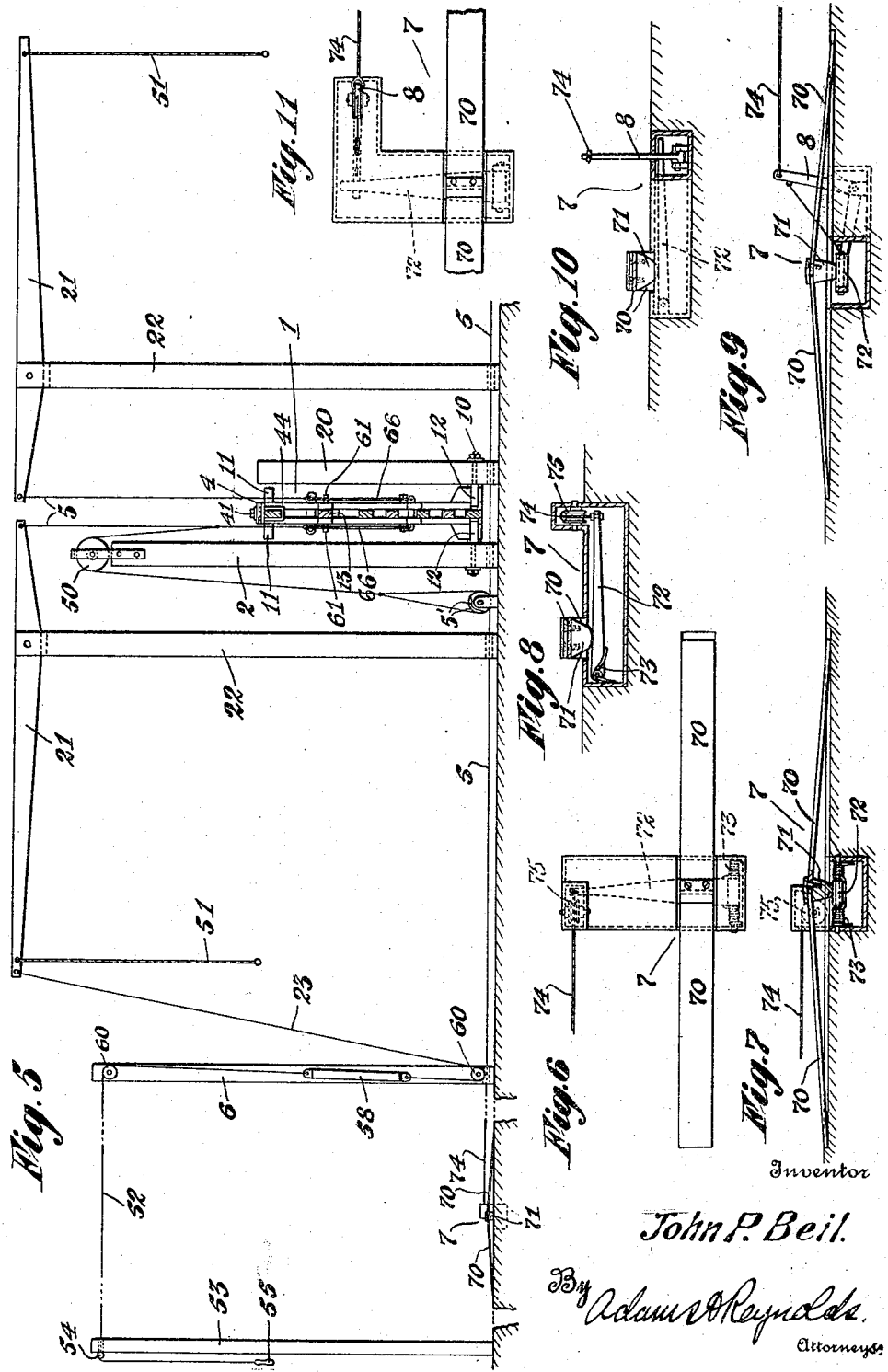

JOHN P. BEIL, OF KING COUNTY, WASHINGTON.

GATE.

1,191,389.　　　　　　　Specification of Letters Patent.　　Patented July 18, 1916.

Application filed April 7, 1915. Serial No. 19,649.

*To all whom it may concern:*

Be it known that I, JOHN P. BEIL, a citizen of the United States of America, and a resident of the county of King and State of Washington, have invented certain new and useful Improvements in Gates, of which the following is a specification.

My invention consists of an improvement in gates by which the gate may be operated either automatically by the action of the vehicle, or at will from a point which may be removed either a short or a considerable distance from the gate, and which may be closed under similar conditions.

The construction and operation of a gate embodying my invention has been shown in the accompanying drawings, and will be described in the specification hereinafter, the particular features of novelty being pointed out in the claims terminating this specification.

In the accompanying drawings I have shown the constructions which are now preferred by me.

Figure 1 is an elevation of the gate, the open position being shown by dotted lines. Fig. 2 is a sectional elevation taken upon the plane indicated by line 2—2 of Fig. 1. Fig. 3 is a section taken upon the line 3—3 of Fig. 1. Fig. 4 shows in detail the upper corner of the hinged end of the gate, the counterweight secured at this point being shown in section. Fig. 5 shows the gate in section by a view similar to that of Fig. 2, and in connection therewith slightly different means for operating the gate. Figs. 6, 7 and 8 are respectively plan and two sectional elevations taken on planes at right angles to each other, of one form of device for operating the gate by the action of wheels of a vehicle. Figs. 9, 10 and 11 are respectively, 9 and 10, sectional elevations, and 11 a plan of equivalent but slightly different means for operating the gate by the action of a vehicle.

The gate 1 is pivoted to swing upon a transversely and horizontally extending pivot axis 10, which is located at one end of the gate, and preferably quite close to the lowermost edge thereof. This pivot axis is supported by two posts, 2, which are separated a sufficient distance to securely hold the gate.

At the upper edge of the gate and at its pivoted end, inclined blocks 11 may be placed at each side thereof, to assist in centrally locating the gate between the posts, and also to prevent undue sidewise movement of the gate. At the lower edge of the gate brace rods 12 may be provided, one end being secured upon the pivot axis 10 and the other end to the bottom bar of the gate. These serve to thoroughly brace the gate.

One of the horizontal bars of the gate, as the bar 13, is mounted to have a limited reciprocation. Stops, as 14, limit the projection of the bar at the swinging end of the gate. This end of the bar projecting, as indicated at 15, is intended for entrance within a recess in a post 16. When so projected, the gate is locked against movement, either horizontally or vertically, and cannot be opened until the bar 13 has been withdrawn. The bar is normally held in projected or locking position, as by means of a spring or springs, of which two are shown, the spring 17 being a coiled spring acting under tension, and 18 a leaf or plate spring, secured to the swinging end edge of the gate, and bearing against the end of the latch bar 13.

After the latch has been released, the gate is swung upward about its axis 10, into the position shown by dotted lines in Fig. 1. To counterbalance somewhat the weight of the gate, I provide one or more counterbalance weights, as 3, which are supported by cords 30 or like means, which extend over pulleys 31 carried by the upper ends of posts 2, and thence extend downwardly to an attachment with the gate at 32.

In gates which are longer than their height, such as the gate shown in Fig. 1, the gate, in its closed position, exerts a stronger torque about its pivot than when in its open position. To compensate for this, I secure to the upper part of the gate, in position substantially vertically above its pivot axis, a compensating counterweight 4. This is made in the form of a container or hollow case, within which may be placed shot or other heavy materials, 40, whereby the weight and effectiveness of this compensating balance may be varied to suit different conditions. This is provided with a threaded opening, which receives a threaded plug 41, or other suitable means by which the material may be secured in place therein. I have also shown it as provided with flanges 42 and 43, which engage respectively with the top and end edges of the gate, and which are secured by U-bolts 44. This compensating counterbalance, being directly over the pivot axis 10 when the longer dimension of the gate is horizontal, is neutral so far as its rotative effect upon the gate is concerned. In this same position of the gate the weight of the gate itself is so disposed as to produce the maximum rotative effect. When the gate is in the open position, wherein its longer dimension is vertical, the rotative effect of the gate proper is much decreased; however, in this position the compensating part 4 is so positioned as to exert its maximum rotative effect. With the weight of this compensating part properly proportioned to the weight of the gate, the combined rotative effect may be equalized for each of these positions.

The counterweight 4 performs two functions; first that purely of a counterweight which has just been described. In addition it serves as a stop and a striking member for the corner of the gate to resist the shock incident upon the stoppage of the gate when it reaches its forward opening position. In this position this corner of the gate rests upon the ground, or some object supported from the ground. In coming down to this position there is apt to be more or less shock. A gate of this kind which is not reinforced at this corner is likely to become racked and in time wrecked. The counterweight 4 projecting in the direction of the length of the gate is certain of contact with the ground before any other part of the gate, and being provided with flanges which extend over the top and side surfaces of the gate and which are strongly secured thereto, very materially adds to the stiffness of the gate.

A cord or cords 5, are secured by one end to the gate at a point, sufficiently removed from both the bottom edge and the end edge which contains the pivot 10, that in each position of the gate, this point of connection is removed laterally from the post upon which the pivot is supported. This cord or cords 5, extend upwardly over guides, as the pulleys 50, and then away from the gate to such distance as may be necessary and suit the purpose desired. In Fig. 1 I have shown the cord 5 as extended to and fastened at the upper end of a post 6, which post is at such distance from the gate as would permit a person seated in a vehicle approaching the gate to grasp the depending cord 51, which is secured to the cord 5, and pull down thereon. Such a pull produces a lateral deflection of the cord 5, and an upward pull upon the end thereof which is attached to the gate, thereby giving the gate an upward impulse, which, if it is unlocked, will cause it to swing up, until its center of gravity has passed beyond its pivot, whereupon it will settle into the position shown by dotted lines in Fig. 1. If, however, the gate is in the open position, as shown by dotted lines, it will be rocked upon its pivot until it swings downward into the closed position.

The operating cord 5, instead of being connected directly with the gate, is connected with a bar or link 66 which is pivoted to the gate at 32. In the locked position of the gate, this bar is deflected from a straight line, and away from the pivot end of the gate, by engagement with a pin 61, carried by the reciprocating latch bar 13. This deflection is produced by the action of the spring or springs 17, 18, which act upon said latch bar to hold it in locked position. The strength of these springs should be sufficient to overcome the horizontal effort due to the deflection of the cord 5.

The first result caused by a pull upon the cord 5, is a withdrawal of the latch bar 13 and the unlocking of the gate. Following this the gate is raised. The link 66 is free to move away from the pin 61 in one direction, which occurs after the gate has been raised to a certain angular position. This link will therefore, assume the position shown by dotted lines in Fig. 1, when the gate is open. In this position the latch bar 13 will be supported by the springs 17, 18. Excessive movement of the latch bar toward the rear end of the gate may be prevented by an additional stop 19.

It is possible to extend the operating cord or wire to a considerable distance from the gate, should this be desired. This may be done by extending the cord 5 directly to said distant point; or this extension may be a separate cord or wire 52, which may be conveniently supported upon as many posts 53 as may be necessary to properly sustain it. It has a sliding or freely movable support with these posts. It may be provided with a stop 54, engaging with the last post of the series, to limit its movement toward the gate, and be provided with a handle, as 55, by which it may be engaged to operate it. At the gate, this cord or wire 52, would pass over an elevated guide 57, thence downward about a guide 56, located a suitable distance beneath the cord 5, and thence upward to a connection with said cord 5. It should also, preferably, have connected therewith an offset tension cord 59 and weight 58, to maintain sufficient tension to properly sustain the wire 52 between its supports.

In Fig. 2 I have shown the operating mechanism as consisting of the parts described in duplicate, these being at each side of the gate, and employing two posts 2, one at each side of the gate.

In Fig. 5 I have shown only one of the posts 2 extending to any appreciable distance above the top of the gate. The other post 20 need extend only sufficiently high to engage the spacing blocks 11, at the top edge of the gate. In this figure the cord 5, by which the gate is operated, extends along the ground, or just above the ground, and over a guide pulley 5', close to the gate, and thence upward over a pulley 50 at the upper end of the tall post 2. Where the distant operating connection is desired, the wire 52 by which it is operated, extends downward along the post 6, which is a short distance from the gate, about a guide pulley 60 carried by the base thereof, and upward as cord 23 to lever 21. The tension weight 58, may be directly connected in this downward run of the wire 52. In Fig. 5 I have also shown levers 21, pivotally mounted on the upper ends of posts 22, located near the gate. The operating cord 5 is directly connected with one end of these levers, while the depending cord 51, which is engaged by the hands in operating the gate, is connected with the other end of the lever. This same end of the lever may be connected by a cord 23, with the cord or wire 52, which extends to the distant operating position. In Fig. 5 I have indicated, at 7, a device by which the gate may be operated by a vehicle. One type of this device is shown in Figs. 6, 7 and 8, and a modification thereof in Figs. 9, 10 and 11. This comprises two boards 70, placed in alinement, their meeting ends being supported on a block 71, which is in turn supported upon a lever 72, which is pivoted at 73, and at its other end has the cord 74 connected thereto and extending upwardly and over a guide pulley 75, and thence extending to the gate and connecting with or substituting for the cord 5, previously described. The meeting ends of the boards 70, are normally slightly raised. A vehicle running upon these planks will depress this end, and cause the lever 72 to be depressed, thereby exerting a sudden pull upon the cords or wire connecting it with the gate. This device should be duplicated at each side of the gate, the one which is placed where it is engaged before reaching the gate, serving to open the gate, and the one beyond the gate serving to close the gate after the vehicle has passed through.

The modified construction shown in Figs. 9, 10 and 11 substitutes a rocking bell-crank lever 8 for the pulley 75, the swinging end of the lever 72 resting upon one branch of the lever 8, and the cord or wire 74 being connected with the other arm.

Having now described my invention, what I claim and desire to secure by Letters Patent of the United States is:

1. In combination, a gate, an operating means therefor employing a cord or like strain conductor, two elevated supports for said strain conductor near the gate, but separated from each other, the end of said strain conductor distant from the gate being anchored, a second strain conductor connected to the first named between its said supports, and a guide for said second strain conductor located laterally from its direction of extent, and other guides for said last named strain conductor leading it to a distant point.

2. In combination, a gate, an operating means therefor employing a cord or like strain conductor, two elevated supports for said strain conductor near the gate but separated from each other, the end of said strain conductor distant from the gate being anchored, a second strain conductor connected to the first named between its said supports, and a guide for said second strain conductor located laterally from its direction of extent, other guides for said last named strain conductor leading it to a distant point, and a tensioning weight connected with the end of said last named strain conductor adjacent the gate to normally relieve the first named strain conductor of the pull thereof.

3. In combination, a gate, mounted upon a transverse pivot axis located at an end, a reciprocating latch bar, a spring normally holding the latch bar in locking position, a latch throwing lever pivoted upon the gate, two cords, one connected with the swinging end of said lever and the other with the gate at the pivot of said lever, guides for said cords located in elevated position above the pivoted end of the gate, a counterweight secured to the end of the cord which is secured directly to the gate, and a stop member connected with the latch bar and engaging said pivoted lever to deflect it toward the swinging end of the gate when the gate is in closed position, an anchorage connection for the other end of the cord which is connected with the latch-throwing lever, an operating cord connected with the last mentioned cord between its anchorage and its elevated guide, a guide for the operating cord located laterally from the latch throwing cord, and guides for the operating cord leading it to a distance.

4. A gate having a pivot extending horizontal transversely of a lower corner and a counterweight consisting of a hollow case secured at the upper corner of the gate which is over the pivot when the gate is closed; said case having flanges extending over the top and end surfaces of the gate by which it is secured in place, the case serving as a strengthening member for the corner of the gate and a striking member, as the gate reaches its opened position.

5. In combination, a gate mounted upon a transverse axis located at one end thereof, a post alongside the gate adjacent its pivoted end, a line guide upon said post in an elevated position, an operating cord passing over said guide and extending downward to said gate, a reciprocating latch bar, a spring normally holding said latch bar in locking position, a latch-operating lever pivoted on the gate, said operating cord being secured to the operating lever, and a pin on said latch bar engaging said lever and deflecting it away from the pivot end of the gate when the gate is in closed position, said lever swinging away from the pin, and said lever and cord being in a straight line when the gate is in open position, a second elevated guide upon said post, a cord passing over said guide and being secured to the pivot of said operating lever and lying in a plane outside that of the first cord, and a counter-weight secured to the other end of said cord.

Signed at Seattle, Wash., this 1st day of April, 1915.

JOHN P. BEIL.

Witnesses:
H. L. REYNOLDS,
E. ARLITA ADAMS.

Copies of this patent may be obtained for five cents each, by addressing the "Commissioner of Patents, Washington, D. C."